(12) United States Patent
Sreevalsan et al.

(10) Patent No.: US 11,882,045 B2
(45) Date of Patent: Jan. 23, 2024

(54) SYSTEM AND METHOD FOR CLASSIFYING NETWORK DEVICES

(71) Applicant: SANDVINE CORPORATION, Waterloo (CA)

(72) Inventors: Shyam Sreevalsan, Bengaluru (IN); Rajeswara Rao Muthyala, Bengaluru (IN)

(*) Notice: Subject to any disclaimer, the term of this patent is extended or adjusted under 35 U.S.C. 154(b) by 0 days.

(21) Appl. No.: 17/244,336

(22) Filed: Apr. 29, 2021

(65) Prior Publication Data
US 2021/0344607 A1 Nov. 4, 2021

(30) Foreign Application Priority Data
Apr. 30, 2020 (IN) .............................. 202011018483

(51) Int. Cl.
| | | |
|---|---|---|
| *G06F 15/173* | (2006.01) | |
| *H04L 47/2441* | (2022.01) | |
| *G06N 20/00* | (2019.01) | |
| *H04L 41/16* | (2022.01) | |
| *H04L 41/5025* | (2022.01) | |
| *H04L 47/2483* | (2022.01) | |

(52) U.S. Cl.
CPC ......... *H04L 47/2441* (2013.01); *G06N 20/00* (2019.01); *H04L 41/16* (2013.01); *H04L 41/5025* (2013.01); *H04L 47/2483* (2013.01)

(58) Field of Classification Search
CPC .. H04L 47/2441; H04L 41/16; H04L 41/5025
See application file for complete search history.

(56) References Cited

U.S. PATENT DOCUMENTS

| | | | | |
|---|---|---|---|---|
| 7,664,048 | B1* | 2/2010 | Yung .................... | H04L 47/2483 709/224 |
| 7,778,194 | B1* | 8/2010 | Yung ....................... | H04L 47/10 709/224 |
| 2016/0267164 | A1* | 9/2016 | Luhrs .................... | G06F 16/285 |

(Continued)

OTHER PUBLICATIONS

Extended European Search Report, European Patent Office, on corresponding EP Application No. 21170678.3, dated Sep. 28, 2021.

*Primary Examiner* — Yves Dalencourt
(74) *Attorney, Agent, or Firm* — Amarok IP Inc.; Neil W. Henderson (57) ABSTRACT

A method and system for classifying a device accessing a computer network. The method including: providing a framework of models configured to classify the device; reviewing a network traffic flow associated with a device; extracting flow attributes associated with a network traffic flow; deriving further flow attributes based on the extracted flow attributes; determining at least one model of the framework of models based on the derived flow attributes and extracted encrypted flow attributes; and classifying the device associated with the network traffic flow based on the at least one model. The system includes: a learning engine configured to provide a framework of models; a packet processing engine configured to review a network traffic flow associated with a device; a device classification engine configured to extract flow attributes, derive further flow attributes and determine at least one model; and a device information aggregator configured to classify the device.

18 Claims, 7 Drawing Sheets

(56) References Cited

U.S. PATENT DOCUMENTS

| | | | |
|---|---|---|---|
| 2017/0250879 A1 | 8/2017 | Chadha et al. | |
| 2017/0364794 A1* | 12/2017 | Mahkonen | H04L 47/2441 |
| 2018/0270229 A1 | 9/2018 | Zhang et al. | |
| 2019/0068468 A1* | 2/2019 | Baldi | H04L 61/2517 |
| 2019/0306731 A1 | 10/2019 | Raghuramu et al. | |
| 2020/0127892 A1 | 4/2020 | Savalle et al. | |
| 2022/0109685 A1* | 4/2022 | Hankins | H04L 63/1425 |

* cited by examiner

Figure 7

SYSTEM AND METHOD FOR CLASSIFYING NETWORK DEVICES

FIELD

The present disclosure relates generally to computer network traffic. More particularly, the present disclosure relates to a system and method for classifying user devices accessing the computer network.

BACKGROUND

Network traffic continues to increase all over the world. Further, internet traffic is becoming increasing encrypted in nature. At the same time, network operators, to provide an acceptable level of quality of service and quality of experience to users and subscribers of the network, need to understand who is accessing the network and from what type of device. Accurately identifying the user device is becoming increasingly challenging with increased encryption.

Further, the number and types of networked devices continues to increase. There is now a greater variety of devices accessing computer networks than there has been previously. With this greater variety network operators benefit from knowing the type of device to be able to provide a good quality of service and quality of experience to the users.

It is, therefore, desirable to provide an improved method and system for classifying a device type of devices accessing the computer network.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for classifying a device accessing a computer network, the method including: providing a framework of models configured to classify the device; reviewing a network traffic flow associated with the device; extracting flow attributes (which may be encrypted) associated with the network traffic flow; deriving further flow attributes based on the extracted flow attributes; determining at least one model of the framework of models based on the derived flow attributes and extracted flow attributes; and classifying the device associated with the network traffic flow based on the at least one model.

In some cases, the method may include determining a device type and a platform of the device.

In some cases, the device type may be classified as one of the group comprising: a tablet, a phone, a laptop, a desktop, a home device and an Internet-of-things device.

In some cases, the device platform may be classified as one of the group comprising: a Windows platform, an Android platform, and an iOS platform.

In some cases, the method may further include: determining a confidence level of the classification of the device associated with the network traffic flow; comparing the confidence level with a predetermined threshold; if the confidence level is higher than the predetermined threshold, marking the device associated with the network traffic flow as classified; and if the confidence level is lower than the predetermined threshold, determining whether there is a User Agent string associated with the traffic flow; if there is a User Agent string available, extracting device data from the User Agent String; and updating the classification with the extracted device data.

In some cases, the method may include: determining an accuracy level for at least one model of the frameworks of models; comparing the accuracy level to a predetermined accuracy threshold; if the accuracy level is higher than the accuracy threshold, continue using the at least one model of the framework of models; otherwise, updating or removing the model from the framework of models.

In some cases, the method may further include: determining whether there is further device data to be classified; and reviewing flow attributes associated with the further device data.

In some cases, the method may further include: determining at least one traffic action associated with the device classification; and applying the at least one traffic action to the network traffic flow.

In another aspect, there is provided a system for classifying a device accessing a computer network, the system includes: a learning engine configured to provide a framework of models configured to classify the device; a packet processing engine configured to review a network traffic flow associated with a device; a device classification engine configured to extract flow attributes associated with the network traffic flow, derive further flow attributes based on the extracted flow attributes and determine at least one model of the framework of models based on the derived flow attributes and extracted encrypted flow attributes; and a device information aggregator configured to classify the device associated with the network traffic flow based on the at least one model.

In some cases, the device classification engine may include: a device platform classifier configured to classify a device platform based on the extracted and derived flow attributes; and a device type classifier configured to classify a device based on the extracted and derived flow attributes.

In some cases, the device type may be classified as one of the group comprising: a tablet, a phone, a laptop, a desktop, a home device and an Internet-of-things device.

In some cases, the device platform may be classified as one of the group comprising: a Windows platform, an Android platform, and an iOS platform.

In some cases, the device classification engine may be further configured to: determine a confidence level of the classification of the device associated with the network traffic flow; compare the confidence level with a predetermined threshold; if the confidence level is higher than the predetermined threshold, mark the device associated with the network traffic flow as classified; and if the confidence level is lower than the predetermined threshold, determine whether there is User Agent string associated with the traffic flow; if there is a User Agent string available, having a User Agent Parser extract device data from the User Agent String; and wherein the device information aggregator is configured to update the classification with the extracted device data.

In some cases, the system may further include: a model monitoring module configured to: determine an accuracy level for at least one model of the frameworks of models; compare the accuracy level to a predetermined accuracy threshold; if the accuracy level is higher than the accuracy threshold, continue using the at least one model of the framework of models; otherwise, update or remove the model from the framework of models.

In some cases, the device classification engine may be configured to: determine whether there is further device data to be classified; and review flow attributes associated with the further device data.

In some cases, the system may be further configured to: determine at least one traffic action associated with the device classification; and apply the at least one traffic action to the network traffic flow.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, there is provided a system and method for determining device information of a device accessing a computer network. In particular, the system and method are intended to be initialized by training models based on derived and extracted traffic flow attributes associated with user devices. Once the model is initialized, the system is configured to review network traffic and extract and derive flow attributes from the traffic related to the user device. The system may be further configured to determine the device type, device platform and other features of the device. From the determined information in association with the extracted and derived flow attributes, the system may classify the device accessing the network. Knowing the device, the network operator may be able to apply appropriate policies and/or traffic management to the traffic flow. It will be understood that the system and method may review each new flow to determine the device or type of device or device platform associated with each flow.

Network operators are interested to learn subscriber device information such as, type, make, model, operating system/platform, and other device features (such as screen size, input methods, and the like). Some of the device features may be determined from the type/make/model if this information can be determined. This information helps operators to understand their customers better and is intended to allow operators to provide more personalized and customized services. In particular, knowing the screen size and anticipated data consumption of a device may allow the network operator to manage and provide appropriate or different policies to the traffic flow.

Conventionally, network operators tended to rely on HTTP User Agents and International Mobile Equipment Identity (IMEI) for identifying devices. It has been noted that HTTP User Agents may be unreliable as they can be easily masqueraded by sniffing tools. In addition, with traffic encryption, User Agent information is becoming less accessible or inaccessible to network operators. IMEI is limited to cellular devices and may only be retrievable when the cellular device is not behind a Network Address Translation (NAT) device.

Embodiments of the method and system disclosed herein provide a technique for operators to find device information using machine-learning techniques applied on statistical flow behavior that takes into account real time network performance metrics. Once the device type is known, the network operator may prioritize certain traffic or perform other traffic action, for example, lower the video quality for small screened devices, determine whether the device may be related to IPTV fraud, provide directed marketing or service enhancement offers based on the device, or the like.

Traditional device classification techniques used in network inspection equipment and in deep packet inspection use HTTP User Agent parsing and regex matching. These techniques are susceptible to manipulation by subscribers or services, which engage in HTTP User Agent masquerading and can be used to mislead these traditional classification techniques. If malicious actors succeed in masquerading a device through HTTP user agent spoofing, the network operators may potentially take incorrect actions in terms of network administration or network traffic management. This may create an impact for other users of the network and/or reduce potential income for the network operator. Another limitation of this conventional technique is that it has been found to be impacted by encryption.

A User Agent string is a string that identifies a program making a request to a web server for an asset such as a document, image, web page, or the like. It is a standard part of web architecture and is passed by all web requests in the HTTP headers. The User Agent string is useful because the User Agent string can provide quite specific information about the software and hardware running on the device sending the request. This information typically includes browser operating system and other device information, for example, version number of the browser or device software, device platform information, and the like.

Network operators can extract information from the User Agent string and check device or browser capabilities. With this information, network operators can provide device tailored solutions to manage traffic flow with a goal of improving the QoE of subscribers. This is particularly useful when dealing with the wide spectrum of devices in use today. It may also allow the network operator to get as fine grained as desired on the operator's content targeting strategy.

Another possible use case for a user agent parser is to serve language specific content using the language and locale headers. A further use case is around analytics, as the network operator stores or records device data, this data may be able to provide the network operator with a good device description repository. All this insight can be used to improve content publishing decisions, targeting strategies or conversion optimization. Having a constantly updated method of parsing User-Agent strings also means that the network operator may be aware when new devices use the network services and can identify any issues at an early stage.

Conventionally, a regex approach is used to analyze the User Agent string. This approach relies on pattern or string matching to identify keywords that might identify the underlying device. A typical regex approach would look for the presence of iPhone or Android in the User-Agent string, but there may be accuracy concerns with this approach. Telling Android tablets and phones apart is difficult with this conventional method. There are cases when the device might be an iPhone but the HTTP User Agent string contains only browser information indicating the device is using a Firefox browser. This information would not aid in identifying the device type of the user accessing the Internet.

As User-Agent strings do not conform to any standard pattern, this technique is prone to failure and is unlikely to be considered future proof. A network operator would need to constantly update the regex rules as new devices, browsers, and Operating Systems (OS) are released. Further, the operator would then likely be required to run tests to determine if the solution still works well. At some point, this becomes a costly maintenance job for the network operator, and, over time, a real risk that the network operator is wrongly detecting or failing to detect some portion of the network traffic. Accurately parsing User-Agent strings is one problem. A second problem may be staying on top of the constantly shifting device, browser, OS market with potentially millions of permutations when things like language and locale or side loaded browsers are also layered on to the device information data.

In general, a User Agent string approach is not a standardized or reliable format, and over time has evolved into a chaotic environment that may be unraveled by sustained and dedicated attention to mapping and interpreting this entropy. With growing encrypted traffic, even User Agent strings may be inaccessible which calls for a more reliable and future proof way of detecting device information as provided in the embodiments of the system and method disclosed herein.

Embodiments of the system and method disclosed herein are intended to use network traffic flow behavioral attributes (both learned from the traffic on the wire, and derived by the system from the learned attributes) for classifying a user device. In these embodiments, the attributes used are not likely to be impacted by data encryption. A "flow" is defined as a set of packets between two endpoints (as defined by their source and destination attribute values and start and end times), and as bi-directional (for example, the system may be configured to effectively monitors two sub-flows, one in each direction). The attributes thus extracted are processed and used to train a network of multiple classification models that are used by the system to classify subscriber devices. During deployment the system uses the same attributes, which are automatically extracted and processed and used for real-time inference and classification. There are multiple models, each with its own distinct task and which may or may not interact with multiple other models in the network. The system offers the operators (for example the internet service providers) the flexibility to configure the network based on their use-cases and dimensioning requirements.

Embodiments of the system and method are intended to provide for a solution that is agnostic of the traffic encryption. The system and method are intended to be used for both encrypted and unencrypted traffic. Further, embodiments of the system and method are intended to be capable of classifying a user device to the operator's selected level of classification. For example, the system can classify, using derived and extracted flow attributes, the platform of a user device in question, such as Android, but also the various device types such as Mobile, Tablet, PC, Home Assistant, Smart Camera, and the like. In some cases, embodiments of the system and method may further classify other features of the device as detailed herein.

Embodiments of the system and method detailed herein are intended to provide highly accurate results with extremely low false-positive rates and are intended to be more reliable when compared with conventional approaches. The use of true labelled data, robust supervised learning techniques and a high confidence threshold is intended to provide results that meet high accuracy goals.

Embodiments of the system and method are intended to provide for the ability to classify devices based on network traffic flow attributes and without the need of HTTP User Agent information. Further, embodiments of the system and method may provide ability for users to choose a level of classification, by defining which models are active at any time based on the use-case the operator wishes to deploy. For example: if the primary use-case is device platform (for example, Android, iOS, Windows or the like) then it is possible that only a device platform classifier is required and the remaining models can be turned off to save in performance costs.

In some cases, if the network operator is interested in the device platform from an analytics perspective and does not plan to change traffic management/enforcement rules per device then having a broad device categorization at the platform level might be preferred due to a lighter performance cost. In another case, the network operator may wish to detect whether tethering is in progress and, if the access device is an Apple Device but the system and method determine that Windows related flows are being initiated from the subscriber as well, the data may highlight a tethering scenario. In this case, the tethering flow is likely to be seen as a new traffic flow and can be classified in a similar manner as described herein.

Embodiments of the system and method may further provide the ability to automatically select which classification technique is to be used depending on the kind of traffic that is being seen in the network. It is intended that a very high level of accuracy in the inferences made by the model network for device classification detailed herein, with low false positive rates and accuracy rates of approximately 90% or higher.

Embodiments of the system and method are further intended to provide the ability to easily extend the model network to cater to new devices in a manner that is low cost (in terms of time and man power) and with no service impact to the system and network where the system is deployed.

Figure 1:
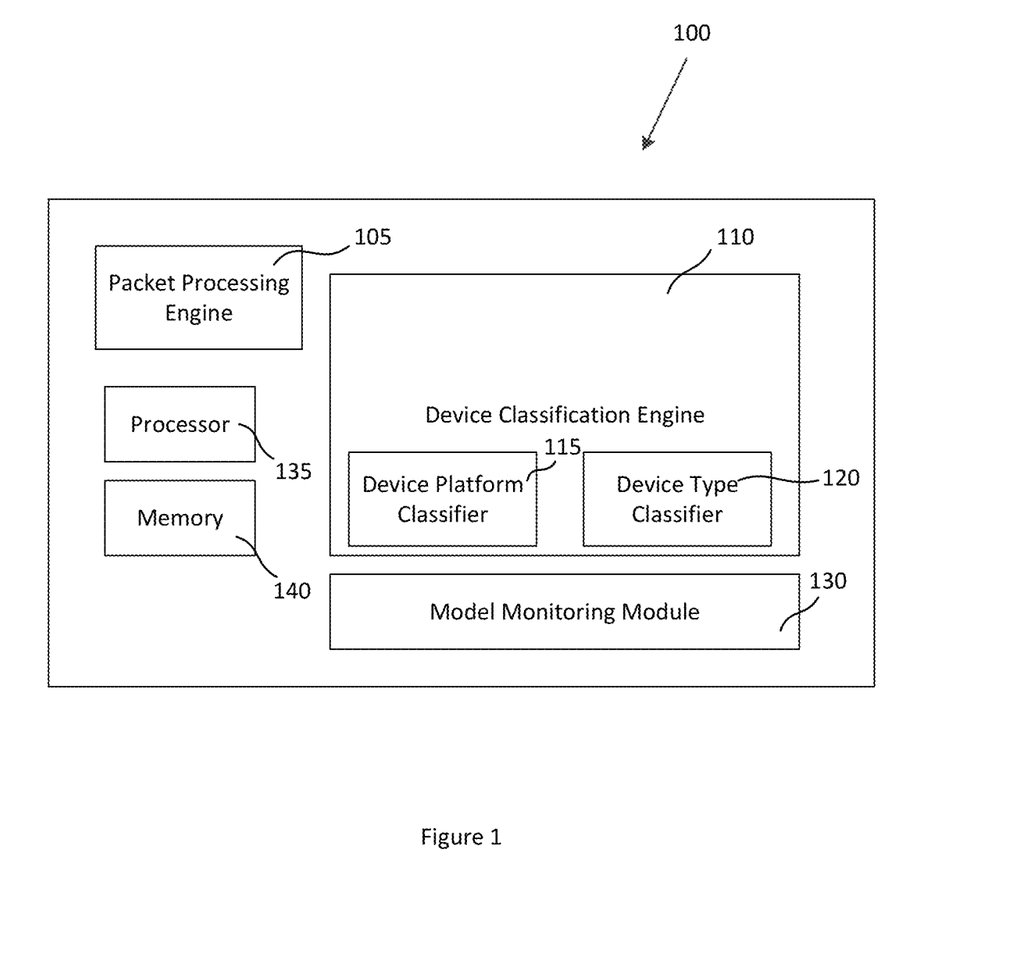
FIG. 1 illustrates a system for device classification according to an embodiment.

FIG. 1 illustrates a system 100 for classifying devices associated with network traffic flows according to an embodiment. The system includes a packet processor engine 105, a device classification engine 110, a model monitoring module 130, a processor 135 and memory 140. In some cases, the system 100 may include a plurality of processors or memories, for example, including at least one processor and memory per module or per engine or the like. In some cases, the system 100 may be distributed and may be housed in a plurality of network devices. In other cases, the system may reside in a single network device. In some cases, the memory 140 may be included as an internal component of the system. In other cases, the memory component may be housed externally or in a cloud and may be operatively connected to the system and the components of the system. The processor 135 is configured to execute instructions stored in the memory component 140 in order to provide the ability to the modules to execute their functions.

The packet processor engine 105 is intended to receive and review the traffic flow. In some cases, the packet processor engine 105 may include a deep packet inspection module. The packet processor engine 105 may extract and derive flow attributes associated with the traffic flow as described in further detail herein. The packet processor engine 105 may further determine if the traffic is encrypted or non-encrypted and whether the traffic flow has an accessible User Agent string to be reviewed.

The device classification engine 110 may include a device platform classifier 115 and a device type classifier 120. The device platform classifier 115 may be configured to categorize and classify the device platform. The device type classifier 120 may be configured to categorize and classify the device type. Further, the device classification engine 110 may have an option to classify non-encrypted traffic via, for example, a traditional solution such as a User Agent parser. Once the device classifier engine 110 determines the device classification, the device classification engine 110 may further review and determine whether any traffic policy would apply to the traffic flow based on the device classification. In some cases, the device classification engine 110 may provide for the traffic policy or may update the traffic policies being applied on the traffic flow.

The model monitoring module 130 is configured to monitor the models currently being used by the device classification engine 110 to classify the device. If the model monitoring module 130 determines that a model is no longer providing results that are above a confidence threshold, the model monitoring model 130 may decommission the model or update or otherwise review the underperforming model.

In some cases, the system 100 may be further configured to management of traffic flow to user devices, such as, for example, perform traffic actions based on the device classification. Similarly, the system may determine appropriate traffic management policies to apply to the traffic flow depending on the device classification for example providing further bandwidth for devices such as smart televisions, different charging schemes for different device types, or the like.

Figure 2:
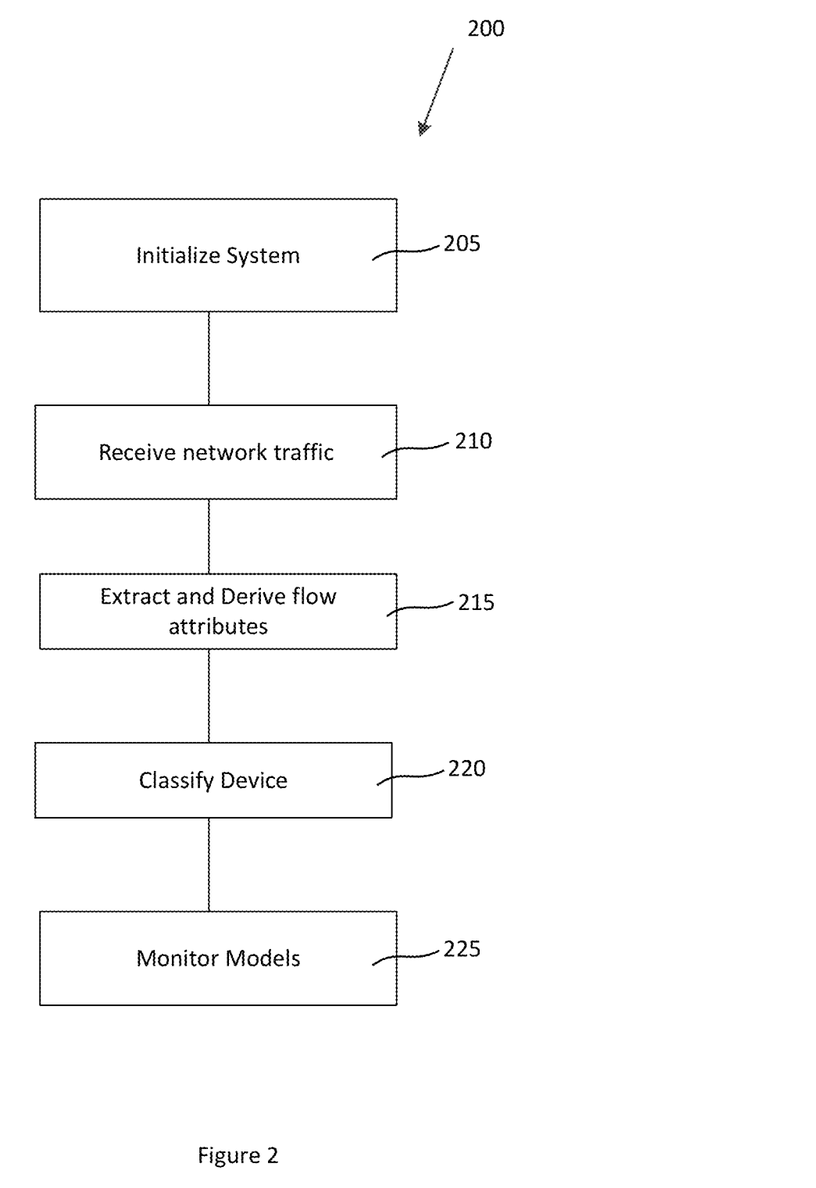
FIG. 2 illustrates a method for device classification according to an embodiment.

FIG. 2 illustrates a method 200 to classify devices and determine device data according to an embodiment. The system is initialized, at 205 through a framework of models that are intended to have learned flow attributes as detailed herein. The packet processor engine then receives and reviews network traffic flows, at 210, and determines if the traffic is associated with a new flow. Flow attributes are derived and extracted from each new network flow, for example, by the device classification engine, at 215. The flow attributes are used by the device classification engine to determine device data associated with the traffic flow using the framework of models, at 220. The model monitoring module 130 is also configured to monitor each model in the framework of models, at 225, in order to determine if a particular model needs to be updated or retrained.

Figure 3:
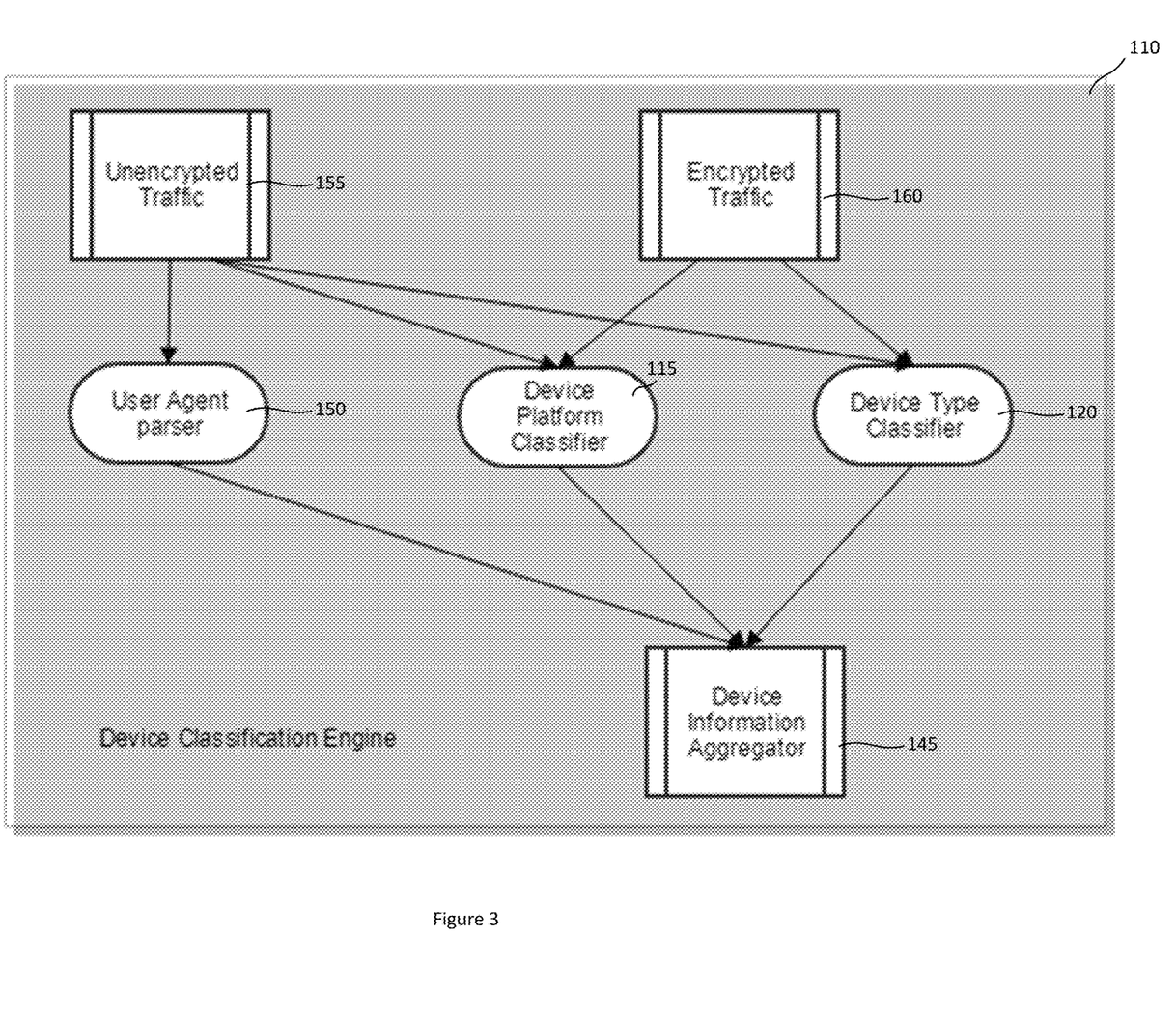
FIG. 3 illustrates a device classification engine according to an embodiment.

FIG. 3 illustrates an example traffic path through the device classification engine 110 of a traffic flow being analyzed. The device classification engine 110 receives unencrypted traffic 155 and encrypted traffic 160. The unencrypted traffic may be reviewed by a conventional solution, for example a user agent parser 150 or the like. In other cases, the unencrypted traffic may still be reviewed by the device classifiers in order to determine the device data. The device classification engine 110 may include two device classification models, the device platform classifier 115 and the device type classifier 120 and a device information aggregator 145. It will be understood that the device classification engine may include further device classifiers depending on the device data the network operator would like to classify. The device information aggregator 145 is configured to aggregate device information outputted by the classifiers after being reviewed by the classification models.

In some cases, the method for classifying the device of the traffic flow may be initiated by creating a model to classify the device associated with the traffic flow. The model monitoring module 130 may also be configured to determine the flow attributes and statistics that form the basis for the data used by the classification models, an overview of the processing techniques applied on this data and finally the process of model training through supervised learning are detailed herein.

In some embodiments, the definition of a "flow" used is such that a flow has the following properties:

The flow occurs between two endpoints.

Each flow may also have values for computed attributes (Class and Kind).

These computed attributes are derived from the endpoint attribute values.

A new flow is generally created when a packet is to be counted that does not match the attributes of an existing flow. The meter records the time when this new flow is created.

Attribute values in the above are set when the meter sees the first packet for the flow, and are not changed.

In some cases, each flow has two packet and two byte counters, one for each flow direction (Forward and Backward). These are updated as packets for the flow are observed by the meter.

The attributes have similar meaning for a variety of protocols (TCP, UDP and others).

Flow attributes are either static or may be associated with continuously updated counters over the lifetime of the flow. Flow attributes are generally not intended to be reset but could be.

Some embodiments of the system and method detailed herein are intended to use Flow Attributes detailed herein and a set of derived attributes which are derived from the inter relation of the Flow Attributes to each other as well as to other attributes of the network. The derived attributes offer a way to infer flow properties that are not altered by the time at which the flow measurement was taken (in other words, these attributes are not intended to by tightly coupled to the age of the flow at any given point in time). When used in conjunction with other derived attributes, standard flow attributes can offer an accurate source of data which describes flow behavior in a statistically predictable and repeatable manner.

The total set of attributes available including the various derived attributes, number in the hundreds and will not be listed in their entirety in this disclosure. Flow attribute measurements are generally made in both directions for bi-directional traffic flows.

The non-derived attributes can be grouped or categorized into the following categories.

Packet Length attributes: Flow attributes related to packet length information including for example IP length related statistics among other parameters.

TCP stack attributes: Flow attributes related to TCP stack parameters.

These attributes are only applicable for TCP traffic and include for example, TCP syn header length, TCP Window Size statistics, among other parameters.

Activity related attributes: Flow attributes related to how active or inactive a particular flow is.

Synchronization and consistency attributes: Flow attributes related to synchronization, re-transmissions and fragmentation of packets belonging to a particular flow.

Temporal attributes: Flow attributes related to time, including statistics regarding the age of the flow, inter arrival time between packets of a flow and other temporal statistics.

Usage attributes: Flow attributes related to usage measured in bytes and packets.

The presence of labelled data is gathered by the system in order to undergo a supervised learning procedure. Labelled data is collected through an automated system of test devices continuously generating labelled traffic for several device types and targeted manual testing and label generation to ensure that the data is diverse and generic in equal measure. The automatic label generation, which may be used in lab environments, is achieved by running system applications on the devices for example, Android, IOS and Windows devices, that generate metadata based on the L7 application or service in use and transmit this information as part of the traffic flow for the system to intercept and process.

Figure 4:
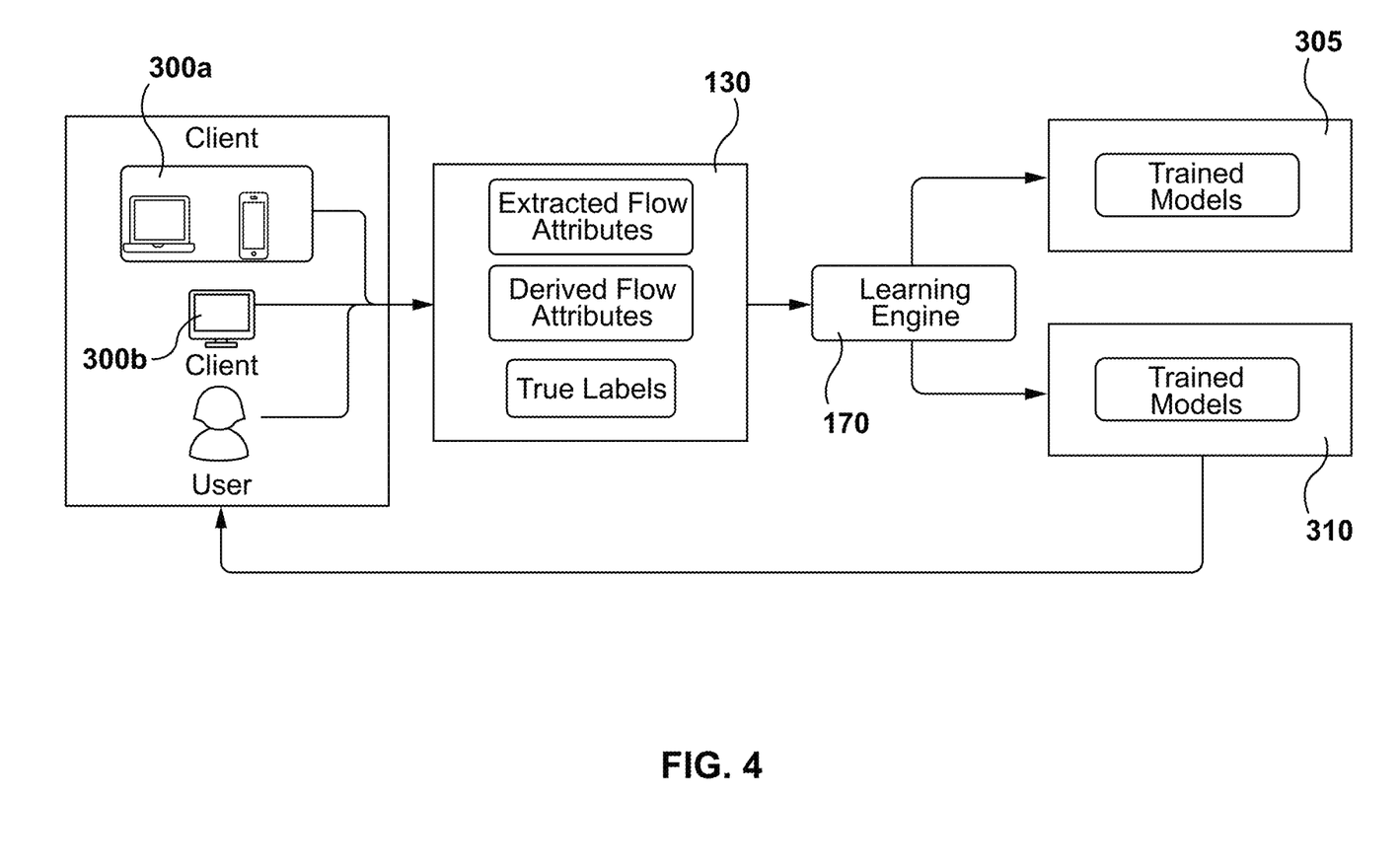
FIG. 4 illustrates labelled data generation according to an embedment.

FIG. 4 illustrates an embodiment of the system and method used to generate labelled data. In particular, devices, such as client devices 300a and user devices 300b are intended to generate traffic flow. The data is review by the model monitoring module 130 to determine extracted flow attributes and derived flow attributes. Further, the true labels will be known as during the initialization, the system is intended to know the client and user devices sending the traffic. A learning engine 170, which may be operatively connected with the model monitoring module 130, is intended to review the attributes. In some cases, the learning engine 170 may be a component of the system and may provide model input to the system. The learning engine 170 may train the classification module at 305 and may further perform model interpretation and visualization at 310. It will be understood that this method may be updated continuously or on a regular predetermined interval. It is intended that the system compares the predictions of the learning engine with preexisting labeled data and may retrain the classification module based on the results of the comparison.

The flow attributes and derived attribute values may be cleaned, processed and prepared for use. This includes imputing the missing or invalid attribute values with the appropriate replacements, ensuring the data is balanced, over-sampling or under-sampling as necessary and normalization and discretization as and when required. The attributes thus extracted and processed and may form the features that will be used by the system to classify devices.

Figure 5:
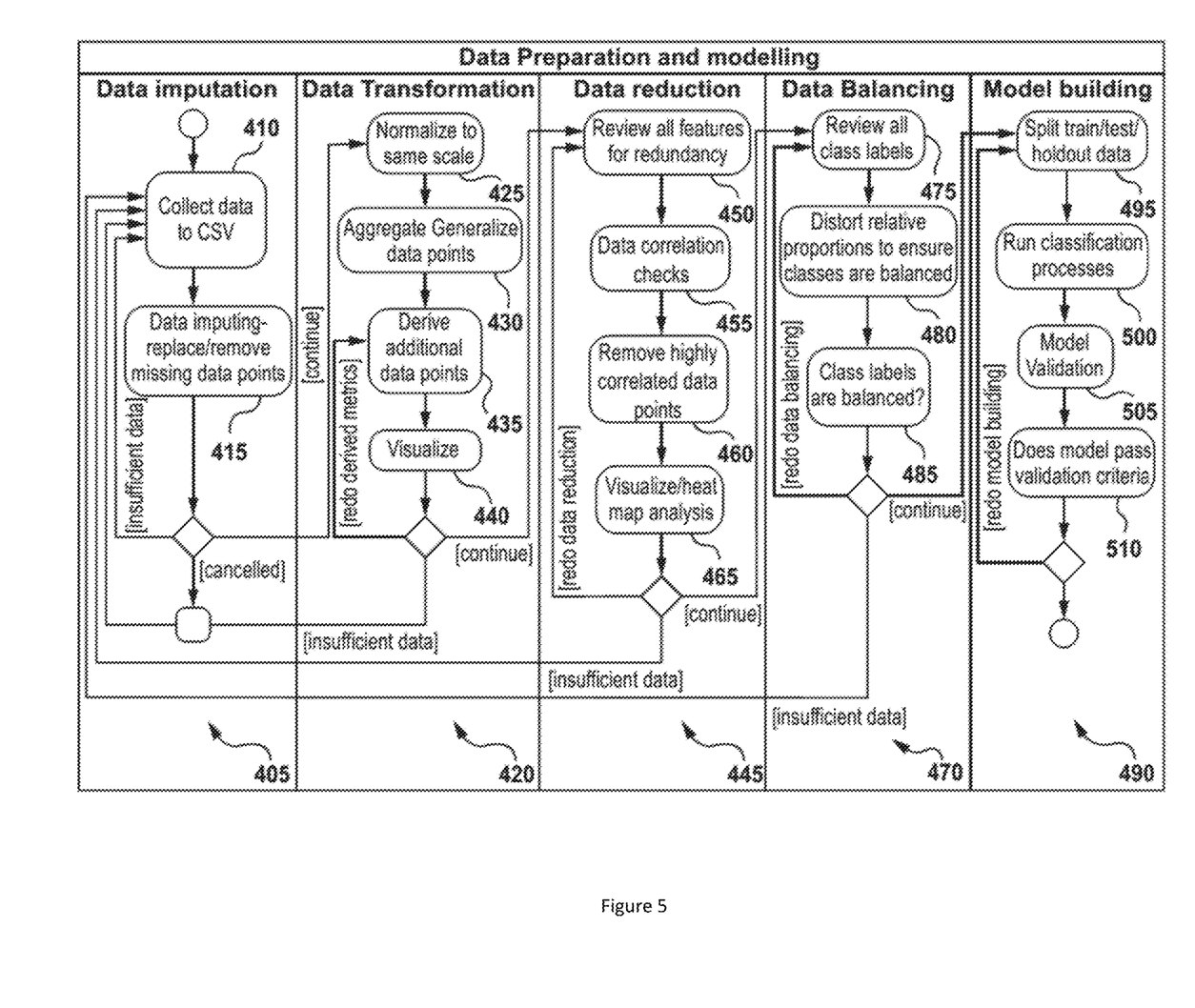
FIG. 5 illustrates a data processing pipeline according to an embodiment.

FIG. 5 illustrates an example 400 of data preparation and modelling according to an embodiment. Data is imputed, at 405, which may include collecting data from various stored files, at 410, and replacing or removing any missing data points, at 415. The data may then be transformed, at 420, for example, the data may be normalized to the same scale, at 425. Data may be aggregated or generalized, at 430, in order to add further meaning and additional data points may be derived, at 435. Data may also be cleaned, for example by removing unnecessary data points or replacing missing data points with meaningful values. This is intended to allow the models to be visualized, at 440.

After the data has been transformed it may be reduced, at 445. The attributes may be reviewed for redundancy at 450, the correlations may be checked, at 455, and highly correlated data points may be reduced, at 460. The data may then be visualized and mapped and the mapping analyzed, at 465. The data may be balanced, at 470, where the class labels may be reviewed, at 475. The data may be balanced to distort relative proportions, at 480, and then reviewed to determine whether the class labels are balanced, at 485. After the data is balanced, the models may be built, at 490. The data may be trained and tested, at 495. The data may be reviewed and the classification models may be run, at 500, to verify their accuracy. Once verified and validated, at 505, it may be determined whether the models pass the validation criteria, at 510. If so, the models may be deployed. In some embodiments, the final trained models may be validated on 'hold out' data that the models have not been exposed to during the training process, the validation may also include data from diverse access network types such as fixed-line, satellite and wireless networks and different traffic conditions including shaping or limiting of traffic to certain fixed bandwidth rates. The validation data is intended to include data from diverse subscriber devices of both new and older platform versions, and from varied device types, for example, tablets, phones, laptops, desktops, gaming consoles, home assistants and other Internet-of-Things (IoT) devices.

The attributes thus extracted and processed will form the features that will be used to train the multi-class models that are used by the system to classify and sub-classify devices. For real-time classification, the attributes are intended to be extracted and processed in real-time and used by the system for inference and classification.

During the learning phase, the important attributes (or features) for each individual model are intended to be discovered using feature importance derived through the use of an ensemble of boosted trees or using recursive feature elimination. This may allow for the selection of key attributes and helps keep the models easier to interpret and maintain.

The process to be used by a particular model may also be discovered through an iterative selection process of a pre-selected shortlist of models and processes that have shown to be historically accurate on the type of data that is used by the system. This shortlist is an evolving list and periodically could have newer or more advanced processes added to it in the future. Some of the process, include, for example:

Decision Trees
Naïve Bayes
Tree Aided Bayesian Networks
Random Forest
eXtreme Gradient Boosting (XGBoost)
Light GBM
Ada Boost
Neural Networks
Fuzzy Logic Inference The iterative selection process described herein is intended to discover the best suited options for each of the models. The selected options are then fine-tuned by configuring their hyper-parameters optimally for each model and the classification problem it is trying to solve.

Figure 6:
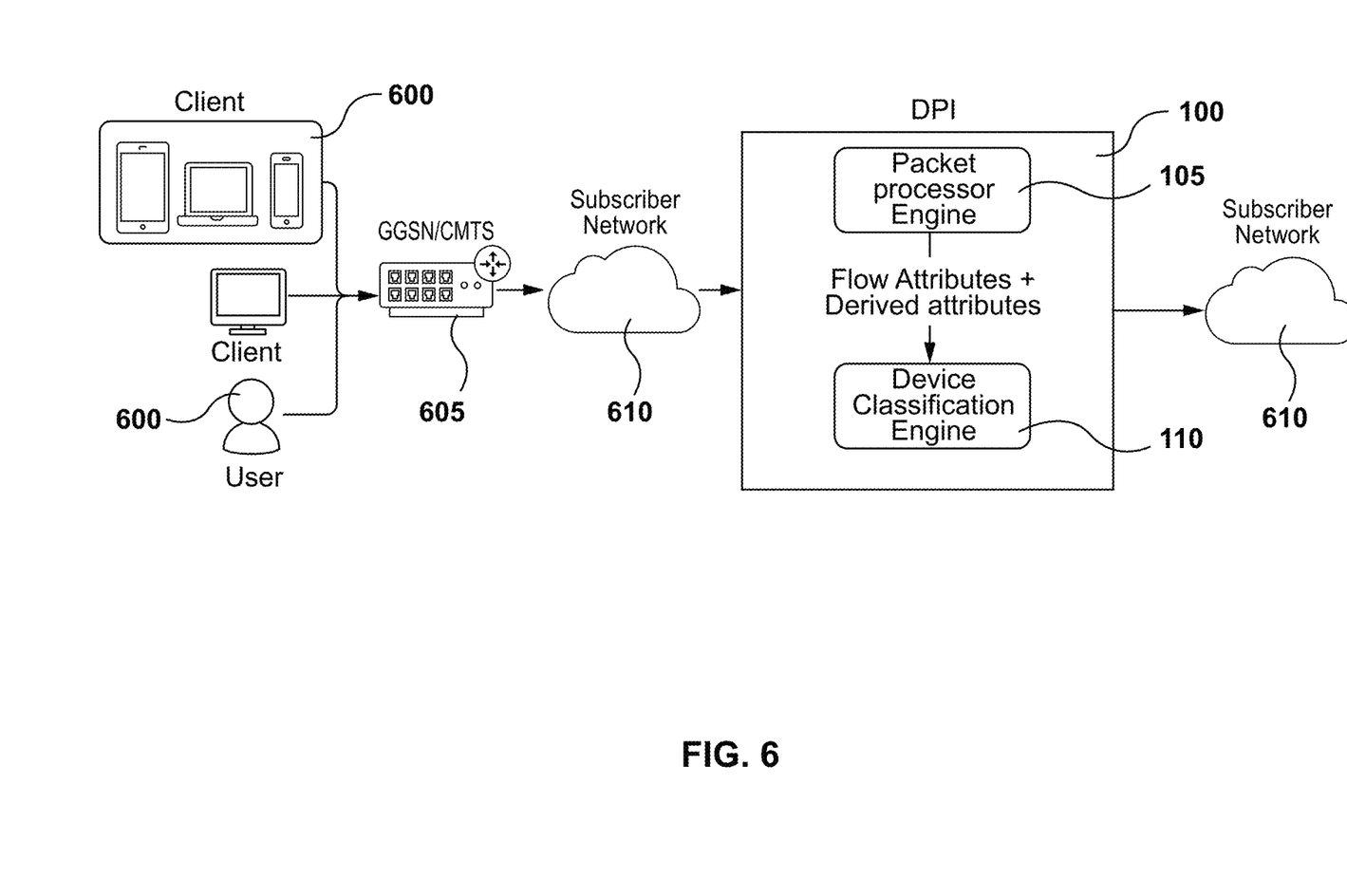
FIG. 6 illustrates a flow of data within the system according to an embodiment.

After the model has been initialized, the network traffic may be inspected. The solution described provides for a network inspection or deep packet inspection system, which intercepts traffic between the client (subscriber network) and server (internet). In addition to packet processing, the system is able to extract the flow attributes mentioned above as well as formulate the different derived attributes. FIG. 6 illustrates an embodiment of the system for device classification within a network. Clients and users of the subscriber network 600 access a Gateway GPRS Support Node (GGSN) or cable modem termination system (CMTS) 605. The GGSN or CMTS transmits the traffic to a subscriber network 610 wherein the system 100 resides. In some cases, the packet processing engine 105 may reside in the network and may transmit data to the system modules that may be located elsewhere but may be operatively connected to the packet processing engine 105.

The system provides for every packet that the system receives may pass through the packet processor but may not necessarily be directed to the device classification engine.

The extracted and derived attributes are shared from the packet processing engine 105 to the device classification. In some cases, the extracted and device attributes may be determined continuously at the packet processing engine by intercepting the device traffic. These attributes may be shared with device classification module only at the time of the classification, which usually happens within a short time of flow initiation, for example 3 seconds, 5 seconds, 10 seconds or the like. It is intended that classification of the device is done once for the lifetime of the flow.

The device classification engine 110 may be used to classify device attributes when the traffic is either encrypted or unencrypted. The previously trained models may be deployed within the device classification engine. The network of models is made up of multiple layers and can be defined based on their function to consist of, classifiers and aggregators.

A device classifier is intended to be a model that performs a classification or categorization of the device based on a certain characteristic (for example: platform or general device type). The device classifier may not classify the exact device but a class of device in use. An example for a classifier, the device platform classifier 115 would be configured to use a model that categorizes devices based on platform type, for example, Windows, Apple and Android.

A device information aggregator 145 is a component of the system, which is intended to receive input from the classifiers and aggregates the device information. The aggregator 145 can also read input from other components, for example, the User Agent parser 150 to use in classification decisions. The output of the device information aggregator may provide for a plurality of aspects or sub categories of devices. Examples of the device information outputted by the device information aggregator could be Android Mobile, Apple Tablet, Windows Laptop, or the like.

The network of models in this embodiment has two classifiers and the aggregator works in association with each of the classifiers. The output of classifiers will be fed as input to the device information aggregator. It will be understood that the system can be extended to have up to 'n' number of classifiers to categorize more aspects/characteristics of the device, whose information can be aggregated by one or more aggregators. In some cases, the system may include further classifiers to categorize streaming devices vs non streaming devices, household IoT vs other IoT, or the like.

The system is configured to infer information from the flow attributes and the derived attributes in order to classify the device. As shown in FIG. 3, the network model may include two classifiers each categorizing the device. In this example, in particular, a device platform classifier and a device type classifier.

The categories of Platform classification are for example, Android Device, Apple Device or Windows Device and the categories of Device Type classification include, for example, Mobile, Tablet, PC, Home/Personal Assistants, Smart Camera, Other (IoT, other smart appliances). It will be understood that platform and type may be amended as the platforms and types of devices accessing the network changes. The device information aggregator is configured to aggregate the detected categories by also factoring in User Agent information (which may only be available for unencrypted traffic) and assign a label or classification to the device. Examples of the labels assigned to the devices by the aggregator may be, for example, Android Mobile Device, Windows PC, Apple Tablet and the like. In some cases, the label may only contain the output from some but not all of the classifiers, if any of the other classifiers failed to classify the device.

As detailed herein, flow payload attributes are used to classify the flows into the above device categories. The extracted, derived and processed flow attributes ($F_i$) for encrypted and/or unencrypted traffic ($T_i$) is sent to the device classification engine where it is forwarded to a plurality of models within the network of models. Each model has its own independent mechanism of inference based on the pre-trained attributes, the inference when made may also include the confidence ($C_i$) expressed in percentage that the model has on that particular inference. Where 100% implies the model is completely confident of the inference based on its knowledge and anything lower implying that there are varying degrees of uncertainty.

Each model can include a pre-configured constant confidence threshold ($C_t$) which can be decided based on the function of a particular model. The system may consider an 80% confidence threshold as an appropriate threshold but this threshold may be configured higher or lower depending on the desire of the operator.

As an example, when, $C_i >= C_t$, the inference is considered to be acceptable and the device classification engine marks the flow with the classification label. When, $C_i < C_t$, the inference is considered unacceptable and the device classification engine may check if User Agent information such as the user agent string is available, if yes then the User Agent parsed output is used to make the classification decision. Only when both $c_i < c_t$ and User Agent information is unavailable or not useful to that particular classifier, is the flow marked as unclassified. Various other configurations of the confidence interval/threshold may also be implemented.

Figure 7:
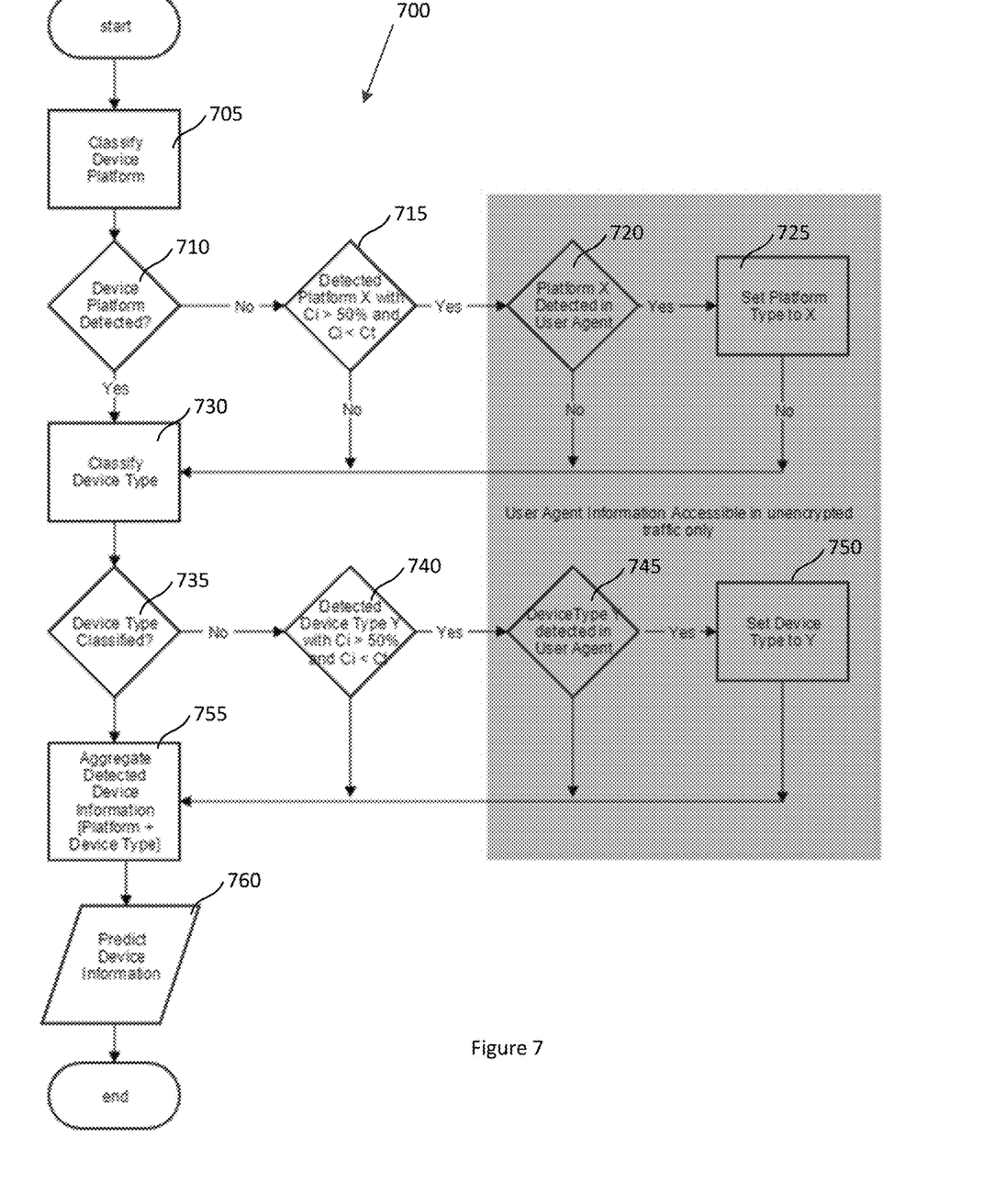
FIG. 7 is a flow chart of a detailed method for device classification according to an embodiment.

FIG. 7 illustrates an example of classifying a device via a method 700 of device classification using the device classification engine 110 according to an embodiment. The device classification receives input from the packet processing engine to start the process at 705. At 710, the device platform may be classified if the device platform classifier classifies the device type and determines a confidence of the classification that is above a predetermined threshold. At 715, it is determined by the device platform classifier if the detected platform has a confidence interval above 50% but lower than the confidence threshold. If the confidence is within this range and if the traffic is unencrypted, the device classification engine may use the User Agent Parser to determine further information at 720, via, for example a user agent string. If the User Agent Parser has further information the platform type of the device may be set at 725.

The device classification engine is further configured to determine the device type at 730 and determine the confidence of the classification. If the classification confidence is above the predetermined threshold then the device type may be considered classified. The device type classifier may classify the device at 735. If the device type classifier classifies the device with a confidence of higher than 50% but lower than the confidence threshold, at 740, than the device classification engine may review the data detected by the user agent parser, at 745. At 750, the device type may be set. At 755, the device information aggregator may aggregate the detected device information, for example determine the platform and the device type. At 760, the device information is predicted. If the device type predicted is a heavy bandwidth consumer, for example, a smart television or the like, an action policy to provide sufficient bandwidth or to guarantee minimal packet latency could be applied by the system in order to provide a subscriber with better Quality of Experience. In some cases, the system may be configured to provide the appropriate traffic action.

Each model within the network of models may be deployed individually or collectively—generally, the model binary files contain the tree or network structure as generally light weight standalone files which may be loaded as plug-ins on to the device classification engine in some cases. In some cases, these model binary files can also be hot-swapped without impact to the system or network. The new files may be added when new models are trained—this could occur periodically (for example once every month, 3 months, 6 months, 9 months, or the like); as a result of stimuli such as a new major device (for example, a new phone model, a new iPad, or the like) being released; or if results from deployed models indicate decay or inaccuracy, such that there is a dip in confidence of the currently deployed models, or for other reasons.

Monitoring systems exist under lab conditions as well as in real network probes to identify if any of the models are dropping in effectiveness or accuracy, a histogram of model confidence may be considered a good indicator of overall effectiveness. For example, if the $80^{th}$ percentile of the model confidence histogram drops below a certain threshold then it triggers a re-training action. In some cases, if the classifier shows less than 80% confidence value for 80th percentile of the predictions, then the system may triggers a retrain action. In other cases, the threshold may be configurable by the network operator and may be higher or lower depending on the use-case or requirements for the system.

If an existing model is found to be requiring an update, the learning process described herein may be repeated for that particular model with necessary changes in data collection, data processing, process selection or training. Once a new model is available and validated, the model may be plugged in to the system replacing the older non-performing model, this activity is not intended to impact the overall network of models.

In a specific example, the system and method may be associated with one of the models that makes up the greater network of models in further detail—each individual model though similar in function is potentially dissimilar in design and implementation. Each model is built using a potentially different base process and may also use a different set of attributes or features.

In this example, a model, named classifier A1, is a higher level classifier model and is used to broadly categorize devices into discrete categories. Classifier A1 takes as input unclassified encrypted traffic in the form of flow attributes that have been extracted or derived and classifies individual traffic flows into discrete device categories, for example, device platforms.

The base process used by classifier A1 may be XGBoost. XGBoost or "Extreme Gradient Boosting" is a gradient boosting library used for supervised learning problems, where the training data is used with multiple attributes or features (Fi) to predict a target variable Yi. The model, classifier A1, is the mathematical structure by which the prediction Yi is made from the input Fi.

The learning phase or training of classifier A1 can be defined as the task of finding the best attributes θ that best fit the training data Fi and labels Yi. To execute this training task, we define an objective function that consists of training loss and a regularization term.

$$obj(\theta) = L(\theta) + \Omega(\theta)$$

where, L is the training loss function, and Ω is the regularization term.

The training loss measures how predictive categorizer A1 is with respect to the training data. The regularization term is intended to control complexity and prevent overfitting. Embodiments of the method and system are intended to review the prediction model to determine whether the model has become overly complex, hyper specialized and/or less generic. If this happens then overfitting may have occurred whereby the model will perform better and better on training data but in the real world it will perform worse because the model may be learning the wrong things about various features.

Flow attributes that are extracted or derived, in other words engineered features, represent the Fi that is used to predict the output, Yi, which consists of the different categories that classifier A1 can classify traffic into.

Fi may include as an example one or more of the following attributes or features:

F1=TCP window size seen in Syn Packet
F2=TCP window size seen in Syn-Ack packet
F3=MSS (Maximum segment size) mentioned in Syn packet
F4=Window Scale Option set by Client/Subscriber
F5=Syn header length
F6=Total TCP push packets
F7=The minimum TCP window size seen by the flow during upload from the subscriber
F8=The maximum TCP window size seen by the flow during upload from the subscriber
F9=The average TCP window size seen by the flow during upload from the subscriber
F10=Ip time to live
F11=The average burst bytes seen by the flow during upload from the subscriber
F12=The minimum inter-arrival time seen by the flow during upload from the subscriber
F13=The average burst bytes seen by the flow during download from the internet These features may have been selected from the machine learning modeling analysis and be determined to contribute most to the prediction variable or output.

Yi consists, for example, of the following categories: Android Device, Apple Device and Windows Device.

In this example, a grid search, measured by cross-validation for accuracy and correctness, is conducted for the optimal hyper attributes to be used. The trained categorizer A1 model may then be validated on a hold-out dataset (Hi) which contains data that was not used during the earlier training and cross validation phases.

The results on testing classifier A1 on Hi is measured for accuracy and the model is deemed acceptable when the following condition is met:

Precision>=0.9 and Recall>=0.9
F1-score>=0.9

It will be understand that to determine the effectiveness of a model, both precision and recall should be reviewed. Precision is intended to determine how many selected attributes are relevant while recall is intended to determine how many relevant items are selected. The F1 score is intended to consider both precision and recall to determine a score.

Before deployment, the confidence threshold (Ct) for this particular model is selected, for example, Ct=90%. During operation, the confidence of inference (Ci) is measured for each flow of traffic inspected by the model and the flow is marked with the appropriate label from Yi if the following condition is satisfied: Ci>=Ct. The following definitions would be understood and pertain to the above example and the disclosure herein.

Constants:
 Ct: Confidence threshold which is constant per model
 Yi: Labels into which the model classifies the flows that it sees as input Variables:
 Ti: Input encrypted traffic to be classified
 Hi: Hold-out data used for final model validation Computed variables:
 Fi: Flow attributes extracted or derived from Ti
 Ci: Confidence of a particular inference by a model In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A method for classifying a device accessing a computer network, the method comprising:
 providing a framework of models configured to classify the device;
 reviewing an encrypted network traffic flow associated with the device;
 extracting flow attributes associated with the encrypted network traffic flow;
 deriving further flow attributes based on the extracted flow attributes of the encrypted network traffic flow;
 determining at least one model of the framework of models based on the derived flow attributes and extracted flow attributes;
 classifying the device associated with the encrypted network traffic flow based on the at least one model, wherein classifying the device type comprises determining at least one of device make or device model; and
 providing appropriate bandwidth to the traffic flow based on the device make or the device model.

2. A method for classifying a device according to claim 1, wherein classifying the device comprises determining a device type, or a device screen size, and a platform of the device.

3. A method for classifying a device according to claim 2 wherein the device type is classified as one of the group comprising: a tablet, a phone, a laptop, a desktop, a home device and an Internet-of-things device.

4. A method for classifying a device according to claim 2 wherein the device platform is classified as one of the group comprising: a Windows platform, an Android platform, and an iOS platform.

5. A method for classifying a device according to claim 1, further comprising:
 determining a confidence level of the classification of the device associated with the encrypted network traffic flow;
 comparing the confidence level with a predetermined threshold;
 if the confidence level is higher than the predetermined threshold, marking the device associated with the network traffic flow as classified; and
 if the confidence level is lower than the predetermined threshold, determining whether there is User Agent string associated with the traffic flow;
 if there is a User Agent string available, extracting device data from the User Agent String; and
 updating the classification with the extracted device data.

6. A method for classifying a device according to claim 1, further comprising:
 determining an accuracy level for at least one model of the frameworks of models;
 comparing the accuracy level to a predetermined accuracy threshold;
 if the accuracy level is higher than the accuracy threshold, continue using the at least one model of the framework of models;
 otherwise, updating or removing the model from the framework of models.

7. A method for classifying a device according to claim 2, further comprising:
 determining whether there is further device data to be classified; and
 reviewing flow attributes associated with the further device data.

8. A method for classifying a device according to claim 1, further comprising:
 determining at least one traffic action associated with the device classification; and
 applying the at least one traffic action to the network traffic flow.

9. A system for classifying a device accessing a computer network, the system comprising:

a learning engine configured to provide a framework of models configured to classify the device;

a packet processing engine configured to review an encrypted network traffic flow associated with the device;

a device classification engine configured to extract flow attributes associated with the encrypted network traffic flow, derive further flow attributes based on the extracted flow attributes of the encrypted network traffic flow and determine at least one model of the framework of models based on the derived flow attributes and extracted encrypted flow attributes; and a device information aggregator configured to classify the device associated with the encrypted network traffic flow based on the at least one model, wherein classifying the device type comprises determining at least one of device make or device model and provide appropriate bandwidth to the traffic flow based on the device make or the device model.

10. A system for classifying a device according to claim 1, wherein the device classification engine comprises:

a device platform classifier configured to classify a device platform based on the extracted and derived flow attributes; and a device type classifier configured to classify a device based on the extracted and derived flow attributes, comprising determining a device screen size.

11. A system for classifying a device according to claim 10 wherein the device type is classified as one of the group comprising: a tablet, a phone, a laptop, a desktop, a home device and an Internet-of-things device.

12. A system for classifying a device according to claim 10 wherein the device platform is classified as one of the group comprising: a Windows platform, an Android platform, and an iOS platform.

13. A system for classifying a device according to claim 9, wherein the device classification engine is further configured to:

determine a confidence level of the classification of the device associated with the encrypted network traffic flow;

compare the confidence level with a predetermined threshold;

if the confidence level is higher than the predetermined threshold, mark the device associated with the network traffic flow as classified; and if the confidence level is lower than the predetermined threshold, determine whether there is User Agent string associated with the traffic flow;

if there is a User Agent string available, having a User Agent Parser extract device data from the User Agent String; and wherein the device information aggregator is configured to update the classification with the extracted device data.

14. A system for classifying a device according to claim 9, further comprising:

a model monitoring module configured to:

determine an accuracy level for at least one model of the frameworks of models;

compare the accuracy level to a predetermined accuracy threshold;

if the accuracy level is higher than the accuracy threshold, continue using the at least one model of the framework of models;

otherwise, update or remove the model from the framework of models.

15. A system for classifying a device according to claim 10, wherein the device classification engine is configured to:

determine whether there is further device data to be classified; and review flow attributes associated with the further device data.

16. A system for classifying a device according to claim 9, wherein the system is further configured to:

determine at least one traffic action associated with the device classification; and apply the at least one traffic action to the network traffic flow.

17. A method for classifying a device according to claim 1, wherein the extracted flow attributes are selected from a group comprising: packet length attributes; TOP stack attributes; activity related attributes; synchronization and consistency attributes; temporal attributes; and usage attributes.

18. A system for classifying a device according to claim 9, wherein the extracted flow attributes are selected from a group comprising: packet length attributes; TOP stack attributes; activity related attributes; synchronization and consistency attributes; temporal attributes; and usage attributes.

* * * * *